US011911990B2

(12) United States Patent
Baumgartner et al.

(10) Patent No.: US 11,911,990 B2
(45) Date of Patent: Feb. 27, 2024

(54) RADIAL PRESS

(71) Applicant: Uniflex-Hydraulik GmbH, Karben (DE)

(72) Inventors: Carsten Baumgartner, Laubach (DE); Reiner Viehl, Schoeneck (DE)

(73) Assignee: Uniflex-Hydraulik GmbH, Karben (DE)

( * ) Notice: Subject to any disclaimer, the term of this patent is extended or adjusted under 35 U.S.C. 154(b) by 0 days.

(21) Appl. No.: 18/240,093

(22) Filed: Aug. 30, 2023

(65) Prior Publication Data

US 2023/0405956 A1 Dec. 21, 2023

Related U.S. Application Data

(63) Continuation of application No. PCT/EP2021/085943, filed on Dec. 15, 2021.

(30) Foreign Application Priority Data

Apr. 12, 2021 (DE) ..................... 10 2021 109 039.3

(51) Int. Cl.
*B30B 7/04* (2006.01)
*B21D 39/04* (2006.01)
(Continued)

(52) U.S. Cl.
CPC ................ *B30B 7/04* (2013.01); *B21D 39/04* (2013.01); *B21J 13/025* (2013.01); *B30B 15/0052* (2013.01); *B30B 15/04* (2013.01)

(58) Field of Classification Search
CPC .. B30B 1/40; B30B 7/04; B30B 15/04; B30B 15/0052; B21D 39/04; B21D 39/046; B21D 39/048; B21J 13/025; B25B 27/10
See application file for complete search history.

(56) References Cited

U.S. PATENT DOCUMENTS 2,999,405 A 9/1961 Ewart
3,427,036 A 2/1969 Siebelhoff
(Continued)

FOREIGN PATENT DOCUMENTS

DE 2844475 A * 4/1980 ............... A61F 2/60
DE 2844475 A1 12/1981
(Continued)

OTHER PUBLICATIONS

International Search Report issued by the European Patent Office for International Patent Application No. PCT/EP2021/085943, dated Apr. 11, 2022.

*Primary Examiner* — Jimmy T Nguyen
(74) *Attorney, Agent, or Firm* — Myers Wolin, LLC

(57) ABSTRACT

A housing of a radial press has a casing section and an annular end-face support disc. An annular structure is movably guided in the housing along a press axis, and multiple press jaws arranged about the press axis are supported on the support disc so as to be movably guided in the radial direction. The annular structure acts on the press jaws by means of control surfaces which are inclined relative to the press axis and which lie against press jaw counter surfaces designed in the form of sliding surfaces. The end face of the ring structure facing the support disc is designed with axial protrusions. Each control surface protrudes into the radial inner surface of one such protrusion, and the support disc has recesses which are paired with the protrusions and into which the protrusions enter when the radial press is closed.

19 Claims, 3 Drawing Sheets

(51) Int. Cl.

| | |
|---|---|
| ***B21J 13/02*** | (2006.01) |
| ***B30B 15/00*** | (2006.01) |
| ***B30B 15/04*** | (2006.01) |

(56) References Cited

U.S. PATENT DOCUMENTS

| | | | |
|---|---|---|---|
| 6,857,305 | B2 | 2/2005 | Essen |
| 2008/0092621 | A1 | 4/2008 | Van Essen |
| 2011/0185784 | A1 | 8/2011 | Van Essen |
| 2014/0331734 | A1 | 11/2014 | Van Essen |

FOREIGN PATENT DOCUMENTS

| | | | |
|---|---|---|---|
| EP | 1302255 | A1 | 4/2003 |
| WO | 2002007912 | A1 | 1/2002 |
| WO | 2005077566 | A1 | 8/2005 |
| WO | 2017178508 | A1 | 10/2017 |

* cited by examiner

RADIAL PRESS

CROSS REFERENCE TO RELATED APPLICATIONS

This application is a continuation under 35 U.S.C. § 120 of International Application PCT/EP2021/085943, filed Dec. 15, 2021, which claims priority to German Application No. 10 2021 109 039.3, filed Apr. 12, 2021, the contents of each of which are incorporated by reference herein.

FIELD OF THE INVENTION

The present invention relates to a radial press with a housing having a jacket portion and an end-face annular bracing disk, an annular structure guided displaceably therein along a press axis and several press jaws, which are disposed around the press axis and which are braced in radially displaceably guided manner on the bracing disk and on which the annular structure acts by means of control faces, which are inclined relative to the press axis and bear against mating faces of the press jaws constructed as sliding faces.

BACKGROUND

Radial presses of the generic type mentioned in the foregoing are known from the patent literature (e.g. DE 28 44 475 A1, WO 2005/077566 A1, U.S. Pat. No. 6,857,305 B2, US 2011/0185784 A1, WO 02/07912 A2 and WO 2017/178508 A1). US 2014/0331734 A1, which represents the closest prior art, also discloses a generic radial press. This annular structure, which is displaceable in the housing along the press axis, has at the end face—bounded by a conical outer face and a conical inner face—an annular projection, wherein a helical gearing with sawtooth profile, which in cooperation with corresponding gearings constructed on the press jaws ensures stepwise rotation of the latter around the press axis, is constructed on the conical inner face.

U.S. Pat. No. 3,427,036 A discloses a clamping jig working according to a functional principle comparable to generic radial presses. And from EP 1 302 255 A1 a radial press is known in which a thrust ring acting via taper keys on the press jaws has an annular hydraulic cylinder, into which an annular piston is plunged that in turn is joined via tension rods, on which the thrust ring is slidingly guided, with an end-face annular bracing disk.

For diverse applications, in which the special advantages such as, for example, the very compact design mode come into play, these radial presses have also proven themselves in practice. This is true both for one-stage and two-stage radial presses of this design mode. In this context, one-stage radial presses are such in which, over the entire path of displacement of the annular structure, its axial movement induces, in the press jaws, a radial closing movement that has a fixed relationship to the axial movement of the annular structure. In contrast, in two-stage radial presses, the transformation of the axially directed movement of the annular structure into a radially directed movement of the press jaws varies over the path of displacement of the annular structure. Hereby it is possible to realize radial presses which, despite a relatively short axial overall length, are capable of pressing—over part of the pressing process—with relatively high force; this is so because, in a first phase of the pressing process (during the so-called "rapid traverse"), the closing movement of the press jaws from the opened position of the die takes place initially—corresponding to a relatively steep angle of attack of the control faces—over a relatively short path of displacement of the annular structure, whereas, in a second phase of the pressing process (during the so-called "power traverse"), the closing movement of the press jaws then takes place—corresponding to a relatively shallow angle of attack of the control faces—over a relatively long path of displacement of the annular structure. This rapid traverse is practical not only because a greater path of displacement of the annular structure remains for power pressing; it also contributes to the shortest possible cycle times and thus constitutes a viewpoint of efficiency in the use of the radial press.

The present invention is aimed at providing a radial press of the generic type that in terms of practical utility is further and more extensively improved compared with the prior art mentioned in the foregoing. One of the definitive viewpoints in this respect concerns a particularly favorable relationship of three variables: effective pressing force, maximum pressing path (maximum possible radial closing movement of the press jaws) and overall length of the radial press. A further aspect of practical utility is the suitability of the radial press in question even for tasks existing outside conventional standard applications, i.e. a broad possible range of applications.

SUMMARY

The foregoing object may be achieved according to the present disclosure in that—in a radial press of the generic type—the annular structure is constructed in crown-shaped manner on its end face turned toward the bracing disk and has a number of axial projections corresponding to the number of press jaws, wherein each control face extends into the radial inner face of such a projection and wherein further the bracing disk has recesses, which are associated with the projections and into which the projections are inserted during closing of the radial press.

In surprisingly simple manner, the relationship of effective pressing force, maximum pressing path and radial-press overall length to one another can be optimized to an entirely noteworthy extent by implementation of the present disclosure. This is so because—compared with generic radial presses according to the prior art—the effective lengths of the control faces in inventive radial presses can be made much larger without changing the overall length. Depending on individual configuration, the maximum pressing path—in case of unchanged angle of inclination of the control faces—and/or the maximum pressing force—in case of reduction of the angle of inclination of the control faces—can be increased in this way. Consequently, for certain application situations in which two-stage radial presses were necessary heretofore, even the use of inventive one-stage radial presses is conceivable; since one-stage radial presses are significantly less complex than two-stage radial presses, for example in terms of the construction of the sliding partners, this is an entirely considerable advantage. Viewed from another perspective, the described construction of the radial press yields the advantage that (because of the increased overlapping of control faces and mating faces compared with the prior art), even while the die is wide open, noteworthy pressing forces can be applied on a workpiece without causing the danger that the press jaws will tilt away radially outwardly. Thereby better dimensional and shape stability is ensured, namely conicity of the workpiece is opposed; and also damage to the die due to local overloading (caused by canted orientation) is avoided. It is also possible, by implementation of the present invention, to provide—compared with generic radial presses of known design type—an effective area of contact between the control faces and press jaws that in general is larger, resulting in reduced wear. Beyond the advantages mentioned in the foregoing, the presently described structure also permits—compared with the prior art—a considerably broader possible spectrum of applications of the respective radial press. This is so because the novel geometric relationship, achievable by embodiments of the invention, between the end face of the annular structure, constructed in the manner of a crown, the bracing disk of the housing and the press jaws, ensures that the latter does not tend to tilt during pressing, even if the input of force is severely off-centered, especially if it is severely offset in the direction of the bracing disk compared with the center. Thus, in embodiments of inventive radial presses, it is possible to equip the press jaws in particular with press attachments whose pressing faces (which may be particularly short in axial direction) are located particularly close to the workpiece aperture—provided in the bracing disk—without thereby causing the press jaws to tilt or “seesaw” during pressing. This makes the radial press particularly suitable even, for example, for use as a so-called “calibration press”.

The fact that the number of axial projections—provided on the end face, turned toward the bracing disk, of the annular structure constructed in crown-shaped manner—corresponds to the number of press jaws is particularly advantageous From static viewpoints, namely with respect to a favorable flow of force within the housing with particularly uniform diversion of the axial force exerted on the bracing disk of the housing into its jacket structure.

In the sense mentioned in the foregoing, a first preferred further development of the inventive radial press is characterized in that press attachments having pressing faces offset relative to the axial center of the mating faces are mounted on the press jaws. Certainly this may also be achieved by appropriately shaping press attachments that are mounted more or less in central radially inner manner on the respective press jaws; according to a configuration that is particularly preferred in this respect, however, the press attachments are mounted on the press jaws in the region of their ends turned toward the bracing disk. From viewpoints of overall size of the radial press and of statics, precision/reproducibility as well as handling during changing of the press attachments, it is then quite particularly advantageous when the press attachments are inserted in end-face receptacles of the press jaws formed by corresponding recesses.

Another preferred further development of the invention is characterized in that the recesses into which the projections constructed on the annular structure are inserted are constructed as through holes. In this case, the advantages mentioned hereinabove can be realized to a particularly great extent. Within the scope of the invention, however, it is certainly not ruled out that the recesses may extend only over a noteworthy part (e.g. 70% to 95%) of the axial thickness of the bracing disk, so that the recesses are closed via a material layer at the end face. This may be of advantage in the individual case, for example—to avoid contamination of the environment by attrition of control faces and/or sliding faces—it is desirable for the housing surface to be as closed as possible.

For application practice, it is particularly useful when the advantages described hereinabove in connection with the construction of the radial press are linked in one machine with the advantages derived from other configuration features, such as are known at least partly in themselves from the prior art of radial presses of the generic type (see above). Because of favorable combinatorial effects, particularly advantageous further developments in this sense are also specified in the dependent claims.

Thus, for example, it is particularly favorable when the annular structure comprises an annular-structure base body and exchangeable sliding plates, wherein the control faces are constructed on the surface of the sliding plates. These sliding plates may bear with their rear side turned away from the respective control face on a bracing face, which is constructed on the annular-structure base body. In an advantageous alternative configuration, the annular structure further comprises control bodies, which are mounted exchangeably on the annular-structure base body and have bracing faces, on which the sliding plates bear with their rear side turned away from the respective control face. Particularly preferably, these bracing faces explained in the foregoing (constructed on the annular-structure base body or else on control bodies mounted on these) respectively comprise two support portions, which are separated from one another by a depression situated between them. Bracing of the sliding plates defined in this way acts against their tilting and in fact—within certain limits—also against wear of the sliding plates. In such radial presses, in which the sliding plates bear (directly) on the annular-structure base body and thus also on the projections constructed—in implementation of the present invention—on its end face, it is particularly preferable, however, for the said depression not to extend over the respective entire projection, but instead to taper out respectively before the end face of the associated projection; in this case, the two support portions are joined with one another adjacent to the end face of the respective projection or merge into one another there.

In further use of the knowledge (already explained hereinabove) that the present invention can utilize particularly advantageously in one-stage radial presses, yet another preferred further development of the invention is characterized in that the control faces are of flat construction. Particularly preferably, the control faces bear, in planes perpendicular to the press axis, respectively on a polygon having corners disposed respectively between two press jaws adjacent to one another.

For guidance of the press jaws, it is particularly preferable to provide, on the annular structure, press-jaw guide ribs, which (at least locally) enclose or bound the control faces laterally. If the annular structure is equipped with separate control bodies (see above) mounted exchangeably on an annular-structure base body, it is thus possible to provide two such control bodies respectively on press-jaw guide ribs constructed on the annular-structure base body, so that the control bodies are inserted respectively between two press-jaw guide ribs, which (at least locally) overhang the control bodies radially inwardly, i.e. the control faces constructed on these, in order to guide the press jaws. According to yet another particularly advantageous configuration, first guide elements (e.g. in the form of guide slots), in which corresponding second guide elements (e.g. in the form of guide projections) constructed on the press jaws engage, are constructed on the press-jaw guide ribs explained in the foregoing. In this way it is possible to realize forced guidance of the press jaws on the annular structure, in the sense that, during the return stroke of the annular structure, its movement in question already forces opening of the press jaws (without the assistance of restoring springs). Such forced guidance of the press jaws in turn works against their tilting during a severely off-centered load, especially during force input very close to the bracing disk and in this way assists the positive effects of the construction of the radial press (see above).

According to yet another preferred further development of the invention, the annular structure comprises an annular piston, which is guided sealingly in a press-cylinder portion constructed in the jacket portion of the housing and together with this bounds an annular press working chamber. At its end opposite the annular piston, the press working chamber can be bounded, especially when—according to a preferred further development of the invention—the bracing disk and the jacket portion are part of a one-piece housing base structure, by a housing-closure ring, which is disposed opposite the bracing disk, and in which a sleeve-like extension—bounding the press working chamber at its radial inside—of the annular structure is guided sealingly. In the interests of a fully hydraulic drive for the movement of the annular structure, an annular return-stroke working chamber is particularly preferably disposed between the press working chamber and the bracing disk. Particularly advantageously, this may be bounded by a cylindrical face disposed on the outer circumference of the annular structure and guided in a sealing shoulder integral with the housing.

Particularly advantageously, this return-stroke working chamber is bounded by the press-cylinder portion and an annular zone constructed on the annular piston on its end face turned away from the press working chamber. In this way, only one single continuous cylindrical face to be constructed on the housing is needed for both hydraulic working chambers, which is favorable for simple and inexpensive manufacture of the radial press.

BRIEF DESCRIPTION OF THE DRAWING

The present invention will be explained in more detail in the following on the basis of an exemplary embodiment illustrated in the drawing, wherein.

DETAILED DESCRIPTION OF THE PREFERRED EMBODIMENTS

Figure 1:
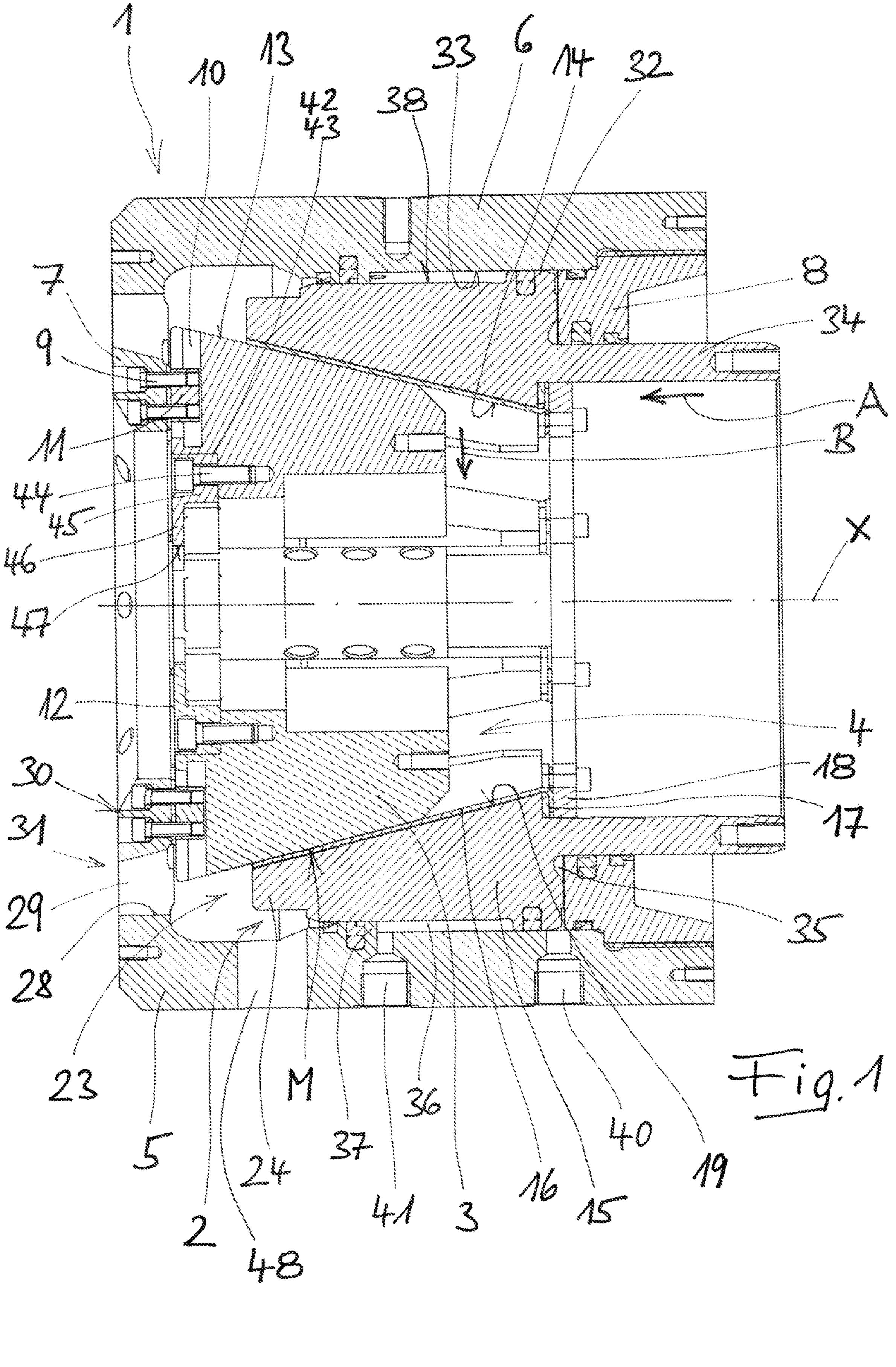
FIG. 1 shows an axial section through a one-stage radial press constructed according to the invention with completely opened die.

The hydraulic radial press shown in the drawings comprises as main components a substantially rotationally symmetric housing 1, an annular structure 2 guided displaceably therein along axis X and a press die 4 having eight press jaws 3 disposed around press axis X. Housing 1 comprises a one-piece housing base structure 5 with a jacket portion 6 and an end-face annular bracing disk 7 as well as a housing closure ring 8 disposed opposite bracing disk 7 in the jacket structure and fixed there. Press jaws 3 are braced—in radially displaceably guided manner via guide elements 11 (sliding blocks) mounted on bracing disk 7 by means of respectively two screws 9 and cooperating with guide slots 10 provided on press jaws 3—on bracing disk 7, wherein respectively one friction-reducing bearing plate 12 is disposed between the end faces of press jaws 3 and bracing disk 7. On the radial outside, press jaws 3 have sliding faces 13. These form mating faces for control faces 14, which are provided on annular structure 2 in a manner inclined relative to press axis X and which cooperate with sliding faces 13 in such a way that an axial displacement (arrow A) of annular structure 2 in the direction of bracing disk 7 induces a radially inwardly directed movement (arrow B) of press jaws 3.

Figure 2:
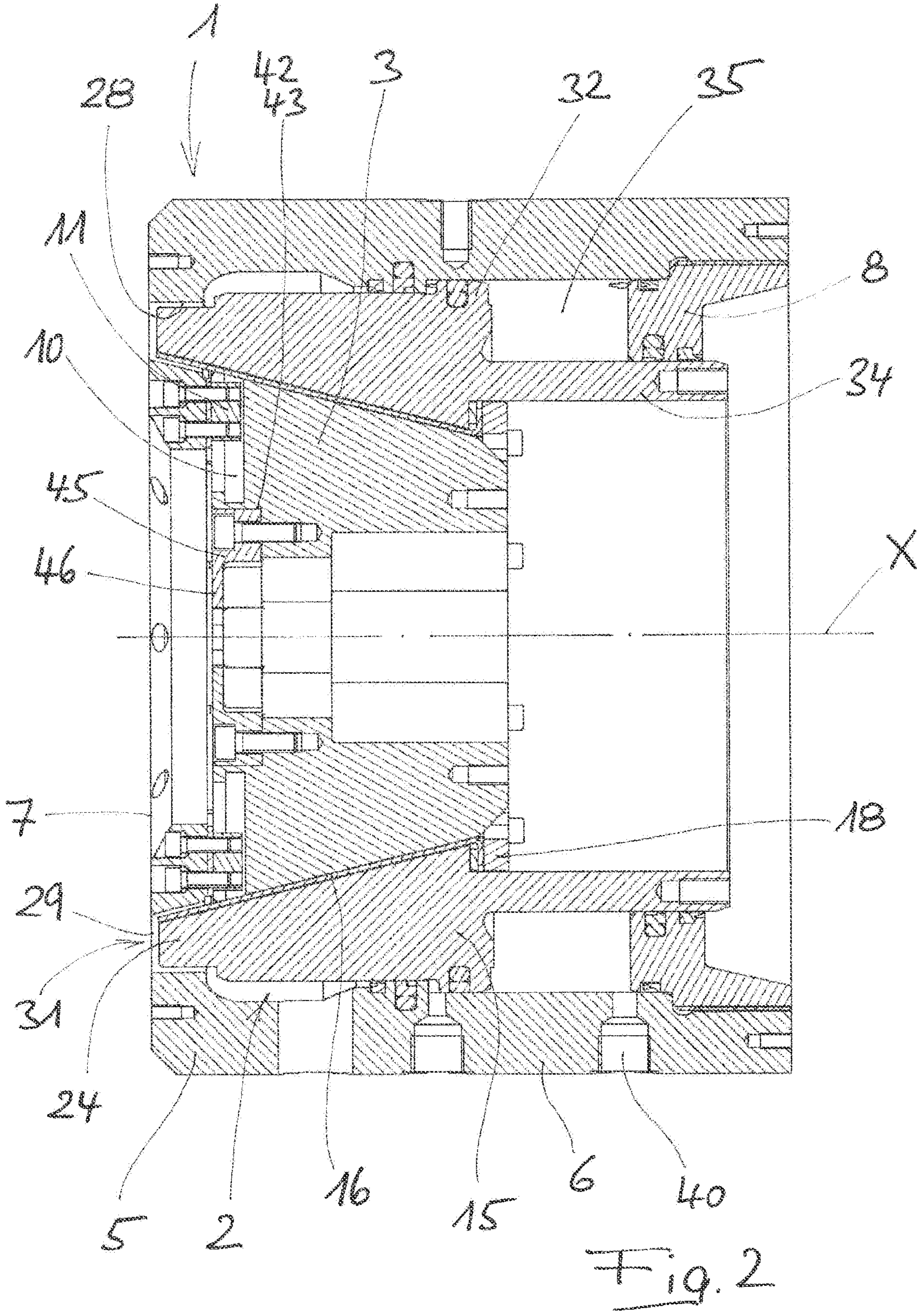
FIG. 2 shows an axial section through the radial press according to FIG. 1 with completely closed die.
Figure 3:
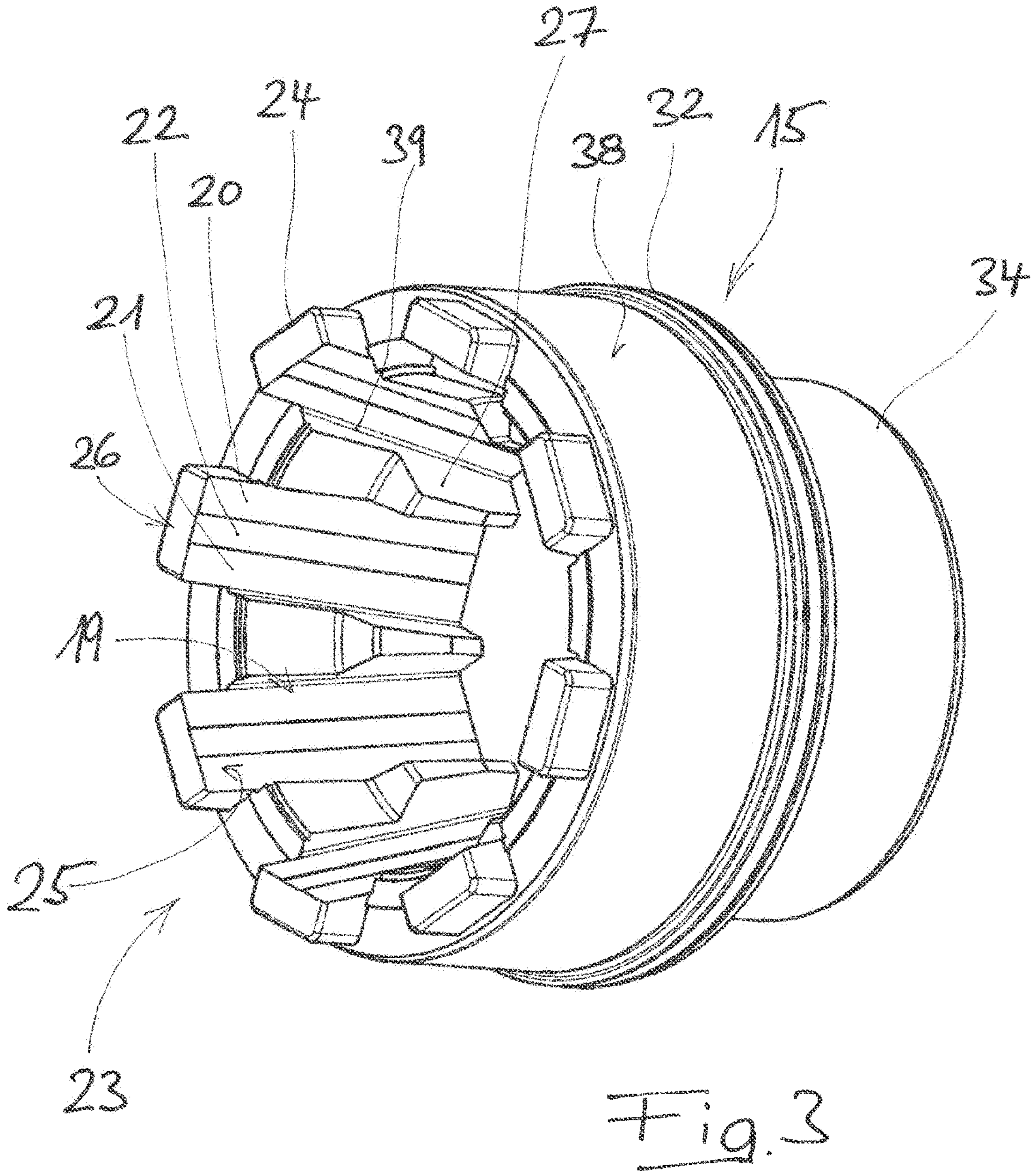
FIG. 3 shows a perspective view of the annular-structure base body of the radial press according to FIGS. 1 and 2.

To the extent explained in the foregoing, the radial press according to FIGS. 1 to 3 corresponds to the well-known prior art disclosed in the documents mentioned in the introduction and cited as reference here, so that more extensive explanations are not needed.

Annular structure 2 has an annularly closed annular-structure base body 15 and eight flat sliding plates 16 mounted exchangeably thereon. These sliding plates 16 are fixed on annular-structure base body 15 by means of a clamping ring 18 acting on end-face, bent-over edges 17 of sliding plates 16. These sliding plates 16 respectively bear—with their rear side turned away from the respective control face 13—on an associated, likewise substantially flat bracing face 19 of annular-structure base body 15. These bracing faces 19 respectively comprise two support portions 20, 21, which are separated from one another by a depression 22 situated between them.

On its front end 23 turned toward bracing disk 7, annular-structure base body 15 is constructed in crown-shaped manner, in that it has eight axial projections 24 there. Bracing faces 19 functioning as bracing for the sliding plates respectively extend into the radial inner face 25 of such a projection 24; and also the sliding plates 16 bearing on bracing faces 19 extend correspondingly, so that each control face 14 also extends as a result into the radial inner face 25 of the respectively associated projection 24. In contrast to the construction shown in FIG. 3, recesses 22 may taper respectively before end face 26 of the associated projection 24. What is evident in FIG. 3 is that the press-jaw guide ribs 27 are constructed—respectively between two mutually adjacent bracing faces 19—on annular-structure base body 15, with guide slots 39, which are provided on them and are designed for cooperation with corresponding guide projections provided laterally on the press jaws.

Bracing disk 7 has eight recesses 28, which correspond to projections 24 of annular structure 2 and are associated therewith, and into which projections 24 are inserted during closing of the radial press (see FIG. 2). These recesses 28 are constructed as through holes 29, which respectively lead toward the free end face 30 of bracing disk 7 into an opening 31.

A double-acting hydraulic drive is used for movement of annular structure 2. For this purpose, annular structure 2 comprises an annular piston 32, which is guided sealingly in a cylindrical portion 33 constructed in jacket portion 6 of housing 1. Cylindrical portion 33, annular piston 32, housing-closure ring 8 and a sleeve-like extension 34 of annular-structure base body 15 guided sealingly in this together bound an annular press working chamber 35. This can be pressurized via a press port 40. An annular return-stroke working chamber 36 is disposed between press working chamber and bracing disk 7. This is bounded by cylindrical portion 33 (which also bounds press working chamber 35), an annular zone constructed on annular piston 32 on its end face turned away from press working chamber 35, a sealing shoulder 37 integral with the housing and a cylindrical face 38 guided in this and disposed on the outer circumference of annular-structure base body 15. Return-stroke working chamber 36 can be pressurized via a return-stroke port 41. The jacket portion 6 of the housing 1 may have a debris discharge opening 48 between the sealing shoulder 37 and the bracing disk 7.

The exemplary embodiment illustrated in the drawing is a so-called calibration press. For this purpose, press jaws 3 are constructed in specific manner, in that they respectively have a recess 42 on their end face turned toward bracing disk 7. This forms a receptacle 43 for a press attachment 45 inserted into it and fixed by means of screw 44. A press face 47—designed for cooperation with the workpiece to be pressed—is provided at the radial inside on press attachment 45 on a narrow, inwardly directed collar 46. What is readily perceptible is the arrangement of press faces 47 directly adjacent to bracing disk 7 and thus offset particularly severely relative to axial center M of mating faces 13 of press jaws 3.

However, it is also immediately obvious that a modification of the shown radial press is possible to the effect that a press attachment (with press face configured in any desired different manner depending on press task) can be mounted respectively at the radial inside—in replaceable manner for change of the press diameter—on the (modified) press jaws 3 in a conventional way known as such.

What is claimed is:

1. A radial press comprising:

a housing (1) having a jacket portion (6) and an end-face annular bracing disk (7), an annular structure (2) guided displaceably in the housing along a press axis (X), and a plurality of press jaws (3) disposed around the press axis (X), wherein the press jaws are braced in radially displaceably guided manner on the bracing disk (7) and the annular structure (2) acts on the press jaws by means of control faces (14), wherein the control faces are inclined relative to the press axis (X) and bear against mating faces of the press jaws (3) constructed as sliding faces (13), wherein:

the annular structure (2) is constructed in crown-shaped manner on its end face (23) turned toward the bracing disk (7) and has a number of axial projections (24) corresponding to the number of press jaws (3), wherein each control face (14) extends into a radial inner face (25) of such each of the projections (24) and wherein the bracing disk (7) has recesses (28), which are associated with the projections (24) and into which the projections (24) are inserted during closing of the radial press.

2. The radial press of claim 1, wherein the recesses (28) are constructed as through holes (29).

3. The radial press of claim 1, wherein press attachments (45) having pressing faces (47) offset relative to an axial center (M) of the sliding faces (13) are mounted on the press jaws (3).

4. The radial press of claim 3, wherein the press attachments (45) are mounted on the press jaws (3) in a region of their ends turned toward the bracing disk (7).

5. The radial press of claim 4, wherein the press attachments (45) are inserted into end-face receptacles (43) of the press jaws (3).

6. The radial press of claim 1, wherein the annular structure (2) comprises an annular-structure base body (15) and exchangeable sliding plates (16), wherein the control faces (14) are constructed on a surface of the sliding plates (16).

7. The radial press of claim 6, wherein the sliding plates (16) bear with their rear side turned away from the respective control face (14) on a bracing face (19) of a plurality of bracing faces, which is constructed on the annular-structure base body (15).

8. The radial press of claim 7, wherein the bracing faces (19) respectively comprise two support portions (20, 21), which are separated from one another by a depression (22) situated between them.

9. The radial press of claim 8, wherein the depression (22) tapers out respectively before an end face (26) of the associated projection (24).

10. The radial press of claim 1, wherein the control faces (14) bear, in planes perpendicular to the press axis (X), respectively on a polygon having corners disposed respectively between two mutually adjacent press jaws (3).

11. The radial press of claim 10, wherein the radial press is a one-stage radial press, wherein the control faces (14) are of flat construction.

12. The radial press of claim 1, wherein press-jaw guide ribs (27) constructed respectively on the annular structure (2) are provided between two press jaws (3) of the plurality of press jaws.

13. The radial press of claim 12, wherein first guide elements are constructed on the press-jaw guide ribs (27).

14. The radial press of claim 1, wherein the annular structure (2) comprises an annular piston (32), which is guided sealingly in a press-cylinder portion (33) constructed in the jacket portion (6) of the housing (1) and the annular piston, together with the press-cylinder portion, this-bounds an annular press working chamber (35).

15. The radial press of claim 14, wherein an annular return-stroke working chamber (36) is disposed between the press working chamber (35) and the bracing disk (7), and is bounded by a cylindrical face (38) disposed on the outer circumference of the annular structure (2) and guided in a sealing shoulder (37) integral with the housing.

16. The radial press of claim 15, wherein the jacket portion (6) of the housing (1) has a debris discharge opening between the sealing shoulder (37) and the bracing disk (7).

17. The radial press of claim 14, wherein the press working chamber (35) is bounded by a housing-closure ring (8) disposed opposite the bracing disk (7) and a sleeve-like extension (34) of the annular structure (2) guided sealingly in it.

18. The radial press of claim 1, wherein the bracing disk (7) and the jacket portion (6) are part of a one-piece housing base structure (5).

19. The radial press of claim 1, wherein exchangeable guide elements (11) cooperating with the press jaws (3) are mounted on the bracing disk (7).

* * * * *